Feb. 10, 1953      S. MAYNER      2,627,764
AUTOMATIC TRANSMISSION
Filed June 17, 1948
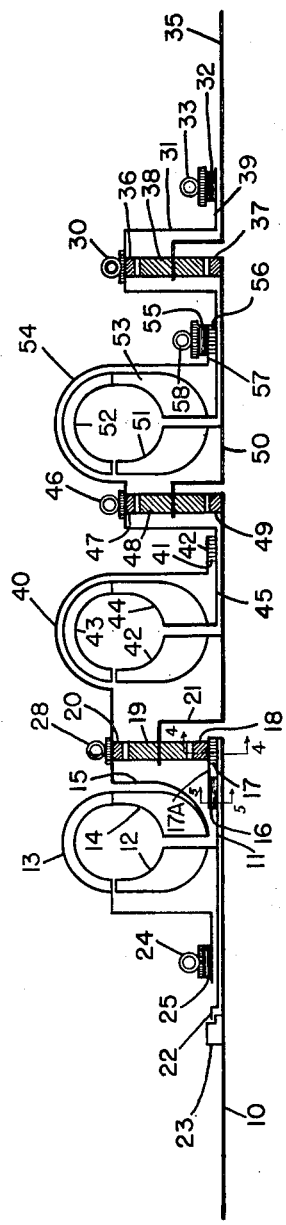
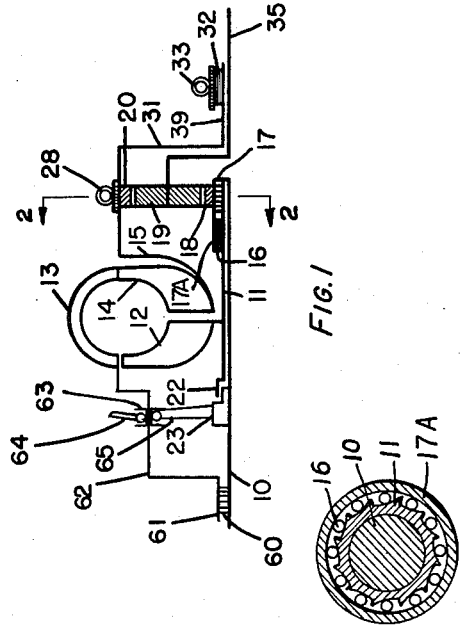
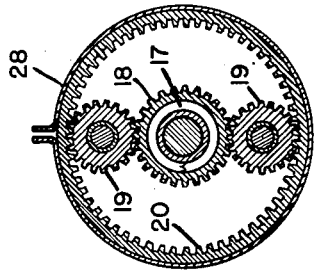
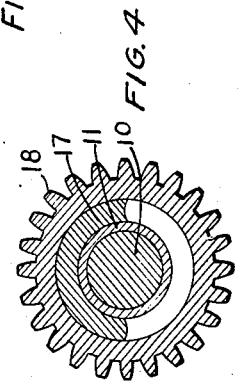
Inventor
STANLEY MAYNER
By Thomas A. Mayner
Attorney

UNITED STATES PATENT OFFICE 2,627,764

AUTOMATIC TRANSMISSION

Stanley Mayner, Cleveland Heights, Ohio, assignor of two-fifths to Thomas S. Mayner, Russel Township, Geauga County, Ohio Application June 17, 1948, Serial No. 33,572

7 Claims. (Cl. 74—732)

This invention relates to automatic transmissions, more particularly to turbine type hydraulic torque converters combined with gearing.

Torque converters in and of themselves usually provide some torque reduction which, however, of itself is generally too low for a great many uses. As a result hydraulic torque converters are usually combined with a gearing arrangement to increase the torque output. Various types of torque transmissions have been proposed; however they lack in various degrees, high torque output, structural simplicity, flexibility, range, etc.

This invention advantageously provides for a torque converter apparatus having an associated gear transmission that provides for high torques; the automatic transmission is simple in construction, it is flexible, and it is one that can be adapted to substantially any range of torque requirement desired.

The apparatus embodies, advantageously, a two member type converter and an associated mechanism for reducing the torque output. Further, for very high reductions the apparatus comprises a plurality of units, a unit being a hydraulic torque converter with associated reduction gearing, combined in a series relation and which automatically combine, both through the hydraulic units and associated gearing, to provide for substantially any torque requirement desired. Where a high torque is positively required substantially immediately the arrangement of this invention provides for a positive power transmission or torque through a combination of all of the mechanical means; or through both the fluid and mechanical means, the latter subsequently yielding to a fully hydraulic drive. The transition from a mechanical or from a combined fluid and mechanical torque output arrangement to a purely fluid arrangement is effected in a flexible and smooth manner. The apparatus is also adapted to be initially entirely fluid where the torque requirement is low. Regardless, however, of the initial manner for overcoming a load the unit will eventually become a hydraulic coupling. Also a means are provided to retard the apparatus or the output if so desired.

The apparatus advantageously comprises a power input shaft about which there is positioned a tubular shaft having a clutch mounted sun or pinion gear. The sun gear is mounted about a spring actuated clutch the helical spring of which has one end fastened to the shaft and the other to the tubular shaft. The helical spring is flat surfaced and when made to expand as, for instance, when the shaft is forward of the tubular shaft it will bind the sun gear making it fast to the tubular shaft. At other times when substantially no load is on the shafts the sun gear is adapted to float about the spring clutch. The input shaft of each hydraulic unit upon rotation simultaneously drives the impeller of each fluid torque converter since the impellers are mounted on the driving shafts.

Further, there is attached to the rotor of each converter an internal gear having positioned about itself a holding means, and a one-way clutch with an optional holding means to prevent reverse rotation of the rotors. In between the internal gear and the spring clutch mounted pinion there are positioned planet gears whose rotation is adapted to drive an output shaft of each complete unit. For instance, when an impeller is driven the pinion or sun gear is also driven actuating the planet gears which react against the inner gear and thus the output shaft of the unit is driven. Initially the driven member or rotor of a unit can be held from reverse rotation to provide reaction for the pinion to thus give a reduced and a positive drive; or the rotor may be permitted to rotate until it assumes its load and then the inner gear will drive the planets. When the rotor assumes its load the planet gears will eventually rotate at the same speed as the rotor, and as the impeller. When the impeller and the rotor rotate at about the same speeds a fluid coupling is effected and subsequently all units become couplings and act as a single drive by becoming positively interconnected.

Reaction for the planetary systems depending upon acceleration or deceleration is provided by either the inner or ring gears, or the sun gears. Since the inner gears are connected to the rotors and the rotors are held from rotation the inner or annular gears provide the reaction for the planets, which are driven by the sun gears. Where the planets tend to overrun the sun gears then the sun gears are adapted to provide reaction for the planets and the rotors are then increasingly driven. Holding means are provided for the inner or ring gears, and they may be selectively utilized. Uni-directional clutches are also provided to prevent reverse rotation of the rotors when the load on the sun gears is greater than the load on the rotors. These clutches need not be used where a fully fluid "cushion effect" is desired as when the rotors are permitted to initially rotate in a reverse direction; they will gradually stop their reverse rotation and become positively driven. The change in direction of rotation will be smooth and gradual.

For greater torque reductions the apparatus may be extended by combining additional torque converter units or stages in a series relation in the manner shown in the drawing. The planet gears of a previous unit advantageously drive the succeeding impellers as well as all of the subsequent pinion or sun gears. Each of the succeeding converters is adapted to assume and share the load in a series succession. As each unit or stage becomes a coupling the couplings become joined to eventually rotate as a single combined coupling unit. The efficiency of the apparatus is equal to that of the first coupling since it is the only unit that is doing the driving when the entire group are joined. The aforesaid arrangement will provide for substantially any torque reduction desired since each stage multiplies the output from the previous one, and as many stages can be had as desired. Further, the apparatus provides for an idling of the prime mover whenever required.

The aforesaid apparatus is more specifically described in the following specification and accompanying drawing; where:

Figure 1 represents a schematic arrangement of a hydraulic transmission apparatus.

Figure 2 is a cross section of the transmission gearing of the apparatus taken along lines 2—2;

Figure 3 represents a schematic diagram of one hydraulic torque converter unit in association with transmission gearing.

Figure 4 is a section across line 4—4 of Figure 3; and Figure 5 is a section across line 5—5 of Figure 3.

Referring to Figure 1 of the drawing there is shown an arrangement of a hydraulic torque converter and gearing that advantageously provides for substantial torque reductions automatically. The unit is adapted to provide for a positive drive that is, an entirely mechanical drive, as well as for a combined fluid and mechanical drive, or purely a fluid drive. It is inherently self retarding, or if it is desired the retardation can be greatly increased through the use of an associated means. Further the unit advantageously permits the idling of a prime mover.

A prime mover (not shown) is adapted to drive the power input shaft 10 of the hydraulic transmission of Figure 1. The shaft 10 is joined to a sleeve 11 which carries the impeller 12 of the hydraulic torque converter unit. The shaft 10 is joined to the sleeve shaft 11 by a flat surfaced helical spring of a known type spring clutch 17 (see Figure 4) which spring forms with a sleeve 17A, a hub extension of the pinion gear 18, mounted about the spring a clutch for the pinion gear 18. Other similarly acting clutches can also be utilized. The hydraulic converter advantageously comprises only two members, an impeller 12 and the fluid receiving and reversing rotor 13. To the rotor 13 there is attached a ring or annular gear 20 which forms part of a planetary system including also the planets 19 and the pinion 18, all being in meshing relation. The fluid when leaving the rotor 13 is guided through a channel 14 having only enclosing walls. Further, the ring or annular gear 20 has associated with it, as by means of a housing or sleeve 31 and the sleeve 39, a uni-directional brake 32 which can be of any known type. A holding band 33 is positioned about the uni-directional brake 32. The brake 32 is adapted to hold the rotor 13 from reverse rotation which occurs upon starting by actuating the holding band 33 which will grasp the outer ring of the brake to render the brake operable; when the holding band 33 is not used the rotor 13 is then adapted to rotate in a reverse direction for the interval until it is forced to rotate forwardly.

The input shaft 10 is adapted to drive the impeller at all times and the pinion 18 when the inertia of the fluid mass is such that the sleeve 11 tends not to follow the shaft 10. When such a relative rotational displacement of the sleeve 11 and the input shaft 10 occurs the pinion 18 is clutched to drive the planets 19, and their output shaft 35. As the rotor 13 assumes its load and the impeller and rotor reach substantially similar rotation then the pinion and the annular gear 20 will drive the planets and the shaft 35.

For substantial retarding purposes when the shaft 35 has the tendency to rotate faster than the input shaft 10 the gear 20 is held as by a band brake 28 of any desirable type causing the planets 19 to react against the gear 20 and at a substantial reduction to drive the pinion 18. The pinion 18 is substantially immediately locked to the sleeve 11 by the uni-directional clutch 16 (see Figure 5) when the sleeve 17A tends to rotate forwardly. Thus the impeller 12 is loaded and is slowed and the input shaft 10 also tends to drive the prime mover; and in this way the apparatus is retarded. The brake 28 need not be used, and in such an event only a nominal retardation is had since the shaft 35 would drive the ring gear 20 and also the rotor 13 which rotor would drive the fluid in the hydraulic unit to the impeller at a rate faster than the rate of receiving it. This would tend to slow down the apparatus at a gradual rate to the speed of the impeller. The clutch 16 also can serve to positively connect the output shaft 35 to the input shaft 10 for purposes of a rearward starting of the prime mover through the input shaft 10 since it is adapted to secure the sleeve 17A to the sleeve 11 providing gear 20 is held to provide reaction for the planets 19. Depending, further upon whether the shaft 10 or the output shaft 35 is rotating faster either the gear 20 is a reacting gear or the pinion 18. When gear 20 is held the planets react against it to drive shaft 35; when it is not held and shaft 35 is driving the planets will react against the pinion 18 to increasingly drive the rotor and therethrough the impeller and the input shaft.

For idling purposes, or for warming up of the engine it is generally desirable to disconnect the driven shaft 35 or not to drive it. The jaw clutch 22—23 is provided to make a positive connection of the input shaft 10 to the sleeve 11 and to thus prevent the actuation of the clutch 17 by rendering it inactive. Therefore, with the clutch 17 as sectionally shown in Figure 4 being inactive the pinion is adapted to merely float and the rotating impeller 12, even if it should impress a force on the rotor, would not actuate the shaft 35 since the planets would only rotate about their own axes.

Once the rotor 13 and the impeller 12 reach similar rotation they may be positively clutched together to provide for a direct drive. They may be joined by a spring clutch 60 connecting the input shaft 10 to a sleeve or hub extension 61 connected to the rotor 13. The spring clutch 60 when transmitting torque is kept coiled and the sleeve 61 is free of it; when, however, the torque is low and the impeller 12 and rotor 13 approach similar rates of rotation the spring clutch expands to lock the input shaft 10 to the rotor 13. The jaw clutch 22—23 can be actuated through the sleeve 62 by the double collar 63 having an open exterior channel adapted to receive a ball joint of a lever 64 and an inner channel adapted to receive the ball joint of a bar 65 attached to the part 23 of the jaw clutch. Motion of the collar 63 is permitted by slots in the sleeve 62. This means is for purposes of example only and any other commercially known method for locking the input shaft to the torque transmitting apparatus may be employed.

While the apparatus of Figure 1 discloses an arrangement which comprises one fluid actuating unit with gearing the arrangement advantageously can be expanded to embody a greater number without departing from the scope of the invention. A three or more unit arrangement such as shown in Figure 3 can provide for higher torque ratios. The torque ratios are derived from the converters as well as the planet systems and also from the transmission gear sizes, for it can be seen that the torque output of each unit is multiplied by the others. Further such an arrangement is flexible in that it will readily adapt itself to varying loads impressed upon it at highest efficiencies.

Referring to the arrangement in Figure 3 of the drawing the combination shown is adapted to provide for very high torques, generally required by heavy motive equipment. The apparatus comprises a torque transmitting arrangement having a plurality of fluid actuating units or hydraulic converters in a series relation with a gearing torque transmitting means.

Power to the apparatus is provided by the power input shaft 10 which drives or rotates a sleeve positioned about it and joined to it by a clutch 17. The clutch 17 generally comprises a flat-surfaced spring one end of which is connected to the input shaft 10 and the other to the sleeve shaft 11, and a sleeve 17A. When a relative rotation of the input shaft 10 and the sleeve 11 tends to occur in a positive direction as to over-run each other the spring is expanded and the expansion is directed against the inner surface of the sleeve 17A to frictionally bind it to the input shaft. About the sleeve 17A and integrated therewith there is mounted a sun or pinion gear 18 which is driven when the clutch is made to operate positively. The sleeve 17A is advantageously a hub extension of the pinion gear 18 so as to have integrated with it a uni-directional clutch 16 positioned about the sleeve 11 to tie the pinion 18 thereto in the event of a reverse rotation of the power input shaft by the pinion 18. The uni-directional clutch 16 is of a no-back roller type as shown in the section of Figure 5 and it may be any one of the many types that are generally known. It operates, generally, when a vehicle tends to over-run the prime mover and the torque conversion apparatus is used as a speed retarding device. The manner of use and operation will be hereinafter explained.

About the sleeve 11 there is fixedly mounted an impeller 12 the fluid actuating member of a two-member torque converter, the other being rotor 13. Rotor 13 is advantageously a fluid receiving and reversing type having blades positioned at an angle in the direction of its rotation. The rotor empties into a fluid redirecting shroud 14 having only curved enclosing walls. The rotor, advantageously, is of the type shown in the Mayner Patent No. 2,432,115 although other two member hydraulic apparatus can also be utilized in the arrangement of Figures 1 and 3. Further, the rotor 13 has connected to it through a sleeve or its housing 15 an inner gear or ring gear 20. The ring gear 20 forms the outer gear of a planetary gear system in which mesh and ride the planet gears 19 which also rotate about and are actuated by the sun or pinion gear 18.

The input shaft 10, then, through the sleeve 11 is adapted to drive both the impeller 12 and the sun gear 18. The sun gear, if it is secured to the input shaft 10 by the clutch 17, will, of course, immediately drive the planet gears 19 which will rotate within the ring gear 20 since it is substantially stationary upon starting torques. The planet gears 19 upon their rotation will drive an output shaft 21. Eventually upon the rotor 13 assuming its load the ring gear will begin to rotate increasingly until it reaches a speed of rotation substantially equivalent to the sun or pinion 18 and both the sun and ring gear 20 will drive the output shaft 21 since the entire planet system will rotate as a unit.

Generally, upon a sudden acceleration or application of load on the impeller 12 the inertia of the fluid which must be overcome will cause the clutch 17 to function. The input shaft 10 tends to rotate faster than the sleeve 11 on which the impeller 12 is mounted. The relative rotation of the input shaft 10 to the sleeve 11 will cause the spring of the clutch 17 to expand and to bind the sun gear 18. The sun gear 18 then causes the rotation of the planets 19 and they in turn tend to rotate the inner gear 20 in a reverse direction unless gear 20 is held. Such an initial temporary reverse rotation can be advantageous since it provides for a cushioning effect. The rotor gradually will assume its load reverse its rotation to the positive direction and the ring gear 20 will then also drive the planets 19. Where immediate and a positive transmission of torque is desired there is provided an automatically operated uni-directional brake 25 of a generally known type which is adapted to prevent a reverse rotation of the rotor 13 and of the inner gear 20. Further, there is provided a brake or a holding device 24 of the uni-directional brake 25 to render it inactive when so desired. When the holding device 24, which may be of any convenient type, is used the rotor 13 is held from reverse rotation on starting torques; it is held until the force acting on it is great enough to cause it to rotate forwardly.

The input shaft 10 and the sleeve 11 may also be joined in a positive manner and thus render the clutch 17 inactive and to make the apparatus entirely fluid actuated. There is provided about the input shaft and splined or otherwise secured thereto a clutch 22—23 such as a positively locking jaw clutch. The clutch 22—23 is adapted to lock the shaft 10 to the sleeve to directly drive the impeller 12. The impeller in turn will drive the rotor 13 and the rotor 13 will drive the ring gear 20 which will drive the planets 19 and the planets about their axes. The sun gear 18 meanwhile merely floats.

In the arrangement shown in Figure 3 the output shaft 21 of the first hydraulic unit is advantageously the power input shaft of the next unit, and the power output shaft of such next unit is the power input shaft of the following next subsequent unit, etc. The output shaft 21 directly drives the impeller 42 of the second hydraulic unit. The impeller 42 in turn actuates the fluid receiving and reversing rotor 43. The shaft 21, further, directly drives the pinion or sun gear 49 of the planetary system of the second hydraulic unit having planets 48 and ring gear 47 within which the planets rotate. The planets 48 drive an output shaft 50 which in turn drives the next impeller 51 and the pinion 37 of the planet system of the third hydraulic unit. The third hydraulic unit also comprises two members just as the previous two, an impeller 51 and a fluid receiving and reversing rotor member 52. The ring gear 36 is attached to the rotor 52 and planets 38 are adapted to rotate within the ring gear and about the sun gear 37. The planets 38 drive a final output shaft 35 giving the total torque output of the apparatus.

The input shaft 10 is adapted through the first sun gear 16 to drive the output shaft 35. The actuation is effected through the planets of each next succeeding hydraulic unit. Generally, upon starting the driving of the output shaft 35 is substantially entirely through such an arrangement. It can be seen, then, that depending on the gear sizes utilized in the planetary system the torque of the first unit is multiplied by the second, and that of the second is multiplied by the third, and it can continue in such manner, to yield as high a torque reduction as desired. As the torque requirements lessen the hydraulic units assume more and more of the load, first the number one unit, then the second, and so on until each takes its full share. As each assumes its full share it becomes a fluid coupling, and as each becomes a fluid coupling it is joined to the preceding one to eventually form a coupled hydraulic apparatus the entire unit rotating as a direct drive. Such an arrangement advantageously provides for a minimum coupling slippage since means are provided to lock positively all units following the first hydraulic unit to the first unit. The efficiency of the apparatus having several integrated hydraulic units is thus made as high as that of a single coupling unit.

Referring again to Figure 3 there is attached to the first rotor 13 a sleeve or housing 49 terminating in a sleeve section 34. Similarly the rotor 43 of the second unit is attached to a housing 54 which also terminates in a sleeve 57, and the rotor 52 of the third unit is attached to a sleeve section 39. The rotor 43 is joined to its annular or ring gear 47 through the spring of a spring clutch 41, and the rotor 52 is connected to its ring gear 36 through the spring of a spring clutch 56. The spring clutches are like the spring clutch 17 with the exception that the springs must be constrained to be inactive. They are normally in an expanded state. The sleeves 34 and 57 of the housings 49 and 54 are adapted to be frictionally bound by the spring clutches 41 and 56 at all times except when under differential load conditions, that is, whenever the rotors 43 and 52 are under such loads so as to cause a coiling of the springs of the spring clutches to reduce their diameters and thus release the sleeves 34 and 57.

The first rotor 13, in an initial operation, is connected to the subsequent units inasmuch as the sleeve 34 has not yet been released by the clutch 41. A load on the clutch causing it to contract will release the rotor 13. As the impeller 12 increases in rotation the pinion 18 will also more rapidly drive the planets 19, the planet shaft 21 and the second impeller 42. The second impeller 42 then increases in rotation placing an increased force on the rotor 43. Since rotor 43 is held from substantial rotation due to the load on the apparatus the spring of the clutch 41 is kept coiled in a diameter less than the inside diameter of the sleeve 34 causing the rotor 13 to remain independent of the rotor 43. The clutch 41 joining sleeve 45 remains inactive while in a coiled state and the sleeve 34 is permitted to rotate. However, when rotor 43 assumes the load to the point where the tension on the spring is decreased to permit it to grasp the sleeve 34, the sleeve 42 or motor 13 and the rotor 43 are then joined. Meanwhile the third impeller 51 is accelerating as the previous hydraulic units approach a coupling union since it is becoming increasingly faster driven as the gear reductions are reduced in the preceding units. As the rotor 52 is subsequently brought to load, the clutch 56 is caused to expand binding the sleeve 57 to itself. All the rotors are thus joined and the torque is then assumed entirely by the first unit or the rotor 13, which is rotating at a speed approximating that of the impeller 12. All of the hydraulic units then rotate as a unit to drive the output shaft 35 with substantially the torque of the input shaft 10.

Controlled uni-directional clutches are also provided for the second and third units; the unidirectional clutch 55 prevents rotor 43 from reverse rotation and uni-directional clutch 43 prevents rotor 52 from reverse rotation. These clutches are optionally controlled by a holding and releasing means 33 and 58. As stated hereinbefore a release of the uni-directional clutches will permit an initial reverse rotation of each of the rotors due to the greater load on the planets by the pinions of each system causing the ring gears to reversely rotate; their release however, tends to cushion each unit, or the whole apparatus.

For purposes of retarding the apparatus when the output shaft 35 tends to overrun the prime mover a holding means are provided for holding the ring gears and therethrough the associated rotors. The holding means may comprise a braking band placed about the ring gears, or any similarly acting device. Then by braking any or all of the annular gears they are held stationary compelling the planets to react against them driving the related pinions at increased rates to load the impellers and therethrough slow down the input shaft 10 and the prime mover. Since, under such a condition the prime mover is rotating more slowly the tendency will be to accelerate it; the prime mover thus slows the vehicle down. The working fluid in each hydraulic unit is circulated through the members, since the rotors are stationary. For retarding the apparatus then the brake 28 would hold the annular gear 20, and brakes 46 and 30 would hold gears 47 and 36 respectively. The brakes 30, 46 and 29 may be selectively controlled if so desired.

When the unit is being retarded through the use of the brakes there occurs the tendency of the pinion 18 to slip and not to drive the shaft 10 through the clutch 17. To prevent such slipping a one-way clutch 16 is utilized between the sleeve 17 and the sleeve 11 about the shaft 10. The clutch 16 connects the pinion 18 to the shaft 10, and thus there occurs a retardation of the apparatus as the over-running vehicle tends to accelerate the prime mover. The application of all the brakes or holding means of the ring gears provides a retarding force of full gear reduction and of the prime mover.

The holding means need not be used if a strong retardation is not necessary. The apparatus will inherently retard itself. The faster driving output shaft 35 through the planets 38 will drive the driven members 52, 43 and 13 since they are clutched together by clutches 56, 41 to act together on the first ring gear 20, the planets 19, and pinion 18. The sun gear 18 at once becomes clutched to the impeller sleeve 11 as soon as it has a tendency to overrun the sleeve, to drive the prime mover.

The apparatus of Figure 3 can be adapted to be fully directly driven when in a coupled state in the same manner as shown with reference to Figure 1. As stated hereinbefore the fully direct drive can be effected in any of the various ways known and the method of coupling herein shown is intended to be in the way of an example.

I claim:

1. A power transmitting apparatus comprising, a fluid power transmitting device, said fluid power transmitting device having an impeller and a rotor adapted to be actuated by fluid energized by said impeller, a power input shaft to said device, a gear transmission connected to said device and adapted to be driven by the rotor, means for positively connecting the power input shaft with said gear transmission and the fluid power transmitting device as a locked unit with said gear transmission, said power input shaft adapted to drive said gear transmission and the impeller and rotor of said device, a clutch being responsive to load on said apparatus adapted to connect said shaft to said gear transmission, means making said clutch inoperative preventing connection of the input shaft with said gearing, and means including said first mentioned means adapted to connect said input shaft with the transmission and with said device for connecting said power input shaft to the rotor of said device for driving said gear transmission.

2. A power transmitting apparatus comprising, a power input shaft, a fluid impeller adapted to be connected to said shaft, a fluid driven member positioned adjacent said fluid impeller and actuated by the fluid energized by said impeller, a first clutch for connecting said input shaft to said fluid driven member, a second clutch, a planetary gear system, said planetary system including an orbit gear, planet gears, and a sun gear, said orbit gear being attached to said fluid driven member and said sun gear being attached to said power input shaft through said second clutch, said planet gears being in meshing relation with said sun gear and said orbit gear, means for rendering said second clutch inoperable, means for engaging or disengaging said first clutch while simultaneously disengaging or engaging said second clutch, and a manually operative selective device for controlling said second mentioned means.

3. A power transmitting apparatus comprising, a plurality of fluid power transmitting devices arranged in a series relation, a power input shaft for actuating the first of said plurality of fluid power transmitting devices, a planetary gear system attached to each of said plurality of fluid power transmitting devices, each of said fluid power transmitting devices comprising a fluid impeller and a rotor driven by fluid energized by said impeller, said planetary systems comprising orbit, planet and sun gears, the orbit gears of said planet systems being joined to said fluid driven rotors and said sun gears adapted to be joined to said impellers, the planet gears of said planetary systems being in mesh with said sun and orbit gears, means for connecting the power input shaft with the first of said fluid power transmitting devices and the first planetary gear system, said power input shaft being adapted to drive the impeller and rotor of said first fluid power transmitting device and the sun gear of the first planetary gear system, an output shaft from each of said planetary gear systems being driven by the planetary gears of said system, the output shaft of the first of said planetary gear system driving the sun gear of the next planet system and the impeller of the next succeeding fluid power transmitting device adapted to be driven by the fluid energized by its impeller and being adapted to be driven by the rotor of the first transmission, said succeeding rotor adapted to drive the orbit gear of the said planetary gear system, the planet gears driving the output shaft to the next power transmitting device, and means responsive to load on the apparatus for positively interlocking the rotors of said fluid power transmitting devices to form of them a rigid unit.

4. A power transmitting apparatus comprising, a plurality of fluid power transmitting devices arranged in a series relation, a power input shaft to the first of said series of fluid power devices, a planetary gear system attached to each of said fluid power transmitting devices, each of said fluid power transmitting devices comprising a fluid impeller and a rotor driven by fluid energized by said impeller, said planetary systems comprising orbit planet and sun gears, the orbit gears of said planet systems being joined to said fluid driven rotors and said sun gears being joined to said impellers, the planet gears of said planetary systems being in mesh with said sun and orbit gears, said power input shaft adapted to drive the impeller of said first fluid driven power device and the sun gear of the first planetary gear system, a clutch for joining said input shaft to said sun gear, a clutch for joining said power input shaft to the rotor of the first in series fluid power transmitting devices, an output shaft from each of said planetary gear systems being driven by the planetary gears of said system, the output shaft of the first of said planetary gear system driving the sun gear of the next planet system and the impeller of the next succeeding fluid power transmitting device, the rotor of the said next succeeding fluid power transmitting device being actuated by the fluid energized by its impeller, said succeeding rotor driving the orbit gear of the said planetary gear system, the planet gears driving the output shaft to the next power transmitting device, and means responsive to load on the apparatus for positively interlocking the rotors of said fluid power transmitting devices so that the power input shaft is adapted to drive all rotors and their orbit gears.

5. A power transmitting apparatus comprising, a plurality of fluid power transmitting devices arranged in a series relation, a power input shaft to the first of said series of fluid power devices, a planetary gear system attached to each of said fluid power transmitting devices, each of said fluid power transmitting devices comprising a fluid impeller and a rotor driven by fluid energized by said impeller, said planetary systems comprising orbit planet and sun gears, the orbit gears of said planet systems being joined to said fluid driven rotors and said sun gears being joined to said impellers, means for holding the orbit gears and rotors from rotation, the planet gears of said planetary systems being in mesh with said sun and orbit gears, said power input shaft adapted to drive the impeller of said first fluid driven power device and the sun gear of the first planetary gear system, a clutch for joining said input shaft to said sun gear, a clutch for joining said power input shaft to the rotor of the first in series fluid power transmitting devices, an output shaft from each of said planetary gear systems being driven by the planetary gears of said system, the output shaft of the first of said planetary gear system driving the sun gear of the next planet system and the impeller of the next succeeding fluid power transmitting device, the rotor of the said next succeeding fluid power transmitting device being actuated by the fluid energized by its impeller, said succeeding rotor driving the orbit gear of the said planetary gear system, said orbit and said sun gears adapted to drive related planet gears and the planet gears driving the output shaft to the next power transmitting device, means responsive to load on the apparatus for positively interlocking the rotors of said fluid power transmitting devices so that the power input shaft is adapted to drive all rotors and their orbit gears, and means for making inactive said clutch joining the sun gear and power input shaft so that said input shaft drives only the impeller of the first fluid power transmitting device.

6. A power transmitting apparatus comprising, a power input shaft, a plurality of separate fluid power transmitting devices arranged in a series relation having driving and driven elements, said power input shaft driving the first of said devices, means for transmitting the power output from each of said devices connected to the driving and driven elements of the devices, said means positioned between each and after the last of said devices, an output shaft, and means responsive to load impressed on the apparatus including said mentioned means for drivingly interconnecting said plurality of devices and the last of said devices and said output shaft.

7. A power transmitting apparatus comprising, a power input shaft, a plurality of separate fluid power transmitting devices arranged in a series relation having driving and driven elements, said power input shaft driving the first of said devices, means for transmitting the power output from the first and successive devices connected to the driving and driven elements of the devices, said means being positioned between each of said devices and after the last of said devices, interlocking means associated with said power transmitting means for drivingly interconnecting said power transmitting means, an output shaft, and means responsive to load impressed on the apparatus including said two mentioned means for positively drivingly interconnecting said plurality of devices and the last of said devices and said output shaft.

STANLEY MAYNER.

REFERENCES CITED

The following references are of record in the file of this patent:

UNITED STATES PATENTS

| Number | Name | Date |
| --- | --- | --- |
| 1,302,775 | Dickinson | May 6, 1919 |
| 1,795,464 | Banker | Mar. 10, 1931 |
| 2,143,312 | Griswold | Jan. 10, 1939 |
| 2,277,214 | Dodge | Mar. 24, 1942 |
| 2,290,319 | Dodge | July 21, 1942 |
| 2,298,648 | Russell | Oct. 13, 1942 |
| 2,302,714 | Pollard | Nov. 24, 1942 |
| 2,334,394 | Dodge | Nov. 16, 1943 |
| 2,368,873 | Pollard | Feb. 6, 1945 |
| 2,388,062 | Keller | Oct. 30, 1945 |
| 2,410,921 | Avila | Nov. 12, 1946 |
| 2,437,333 | Pollard | Mar. 9, 1948 |
| 2,475,085 | Dunn | July 5, 1949 |
| 2,568,007 | Jandasek | Sept. 18, 1951 |
| 2,570,467 | Molachowski | Oct. 9, 1951 |

FOREIGN PATENTS

| Number | Country | Date |
| --- | --- | --- |
| 101,487 | Great Britain | June 29, 1937 |
| 407,510 | Great Britain | Mar. 22, 1934 |